United States Patent [19]
Lichtman et al.

[11] Patent Number: 5,646,759
[45] Date of Patent: Jul. 8, 1997

[54] FIBER LOOP MIRROR FOR TIME DIVISION DEMULTIPLEXING

[75] Inventors: Eyal Lichtman, Woodbridge; Linn Frederick Mollenauer, Colts Neck, both of N.J.

[73] Assignee: Lucent Technologies Inc., Murray Hill, N.J.

[21] Appl. No.: 555,345

[22] Filed: Nov. 8, 1995

Related U.S. Application Data

[63] Continuation of Ser. No. 94,278, Jul. 21, 1993, abandoned.

[51] Int. Cl.$^6$ .................................................. H04J 14/08
[52] U.S. Cl. ............................... 359/138; 359/123; 385/11
[58] Field of Search ........................ 359/135, 138, 359/139, 123; 385/11

[56] References Cited

U.S. PATENT DOCUMENTS

| | | | |
|---|---|---|---|
| 4,805,975 | 2/1989 | Utaka et al. | 385/18 |
| 5,144,375 | 9/1992 | Gabriel et al. | 356/345 |
| 5,307,428 | 4/1994 | Blow et al. | 385/11 |
| 5,357,359 | 10/1994 | Uchiyama et al. | 359/123 |
| 5,493,433 | 2/1996 | Prucnal et al. | 359/123 |

FOREIGN PATENT DOCUMENTS

WO91/14963  10/1991  WIPO ................ G02F 1/35

OTHER PUBLICATIONS

Sololoff et al, "A Terahertz Optical Aysmmetric Demultiplexer", May 1993, IEEE Photonic Tech pp. 787–790.

Sokoloff et al, "A Terahertz Optical Aysmmetric Demultiplexer", Mar. 1993–OSA Conference.

Glesk et al, Demonstration of all optical demultplexing of TDM data.

Electronic Letters Feb. 1994 vol. 3 No. 4 339–341.

"64 Gb/s All–Optical Demultiplexing With The Nonlinear Optical–Loop Mirror" P. A. Andrekson, et al., IEEE Photonics Technology Letters, vol. 4, No. 6 pp. 644–647, Jun. 1992.

"Bit–Rate Flexible All–Optical Demultiplexing Using a Nonlinear Optical Loop Mirror", D. M. Patrick, et al., Electronics Letters, vol. 29, No. 8, pp. 702–703, Apr. 15, 1993.

"All–Optical High Sweet Demultiplexing With a Semiconductor Laser Amplifier in a Loop Mirror Configuration", M. Eiselt, et al., Electronics Letters, vol. 29, No. 13, pp. 1167–1168, Jun. 24, 1993.

K. Otsuka "Nonlinear Antiresonant Ring Interferometer" Optics Letters vol. 8, No. 9, Sep. 1983, pp. 471–473.

N. J. Doran and D. Wood "Nonlinear–Optical Loop Mirror" Optics Letters, vol. 13, No. 1, Jan. 1988, pp. 56–58.

(List continued on next page.)

*Primary Examiner*—Wellington Chin
*Assistant Examiner*—Rafael Bacares
*Attorney, Agent, or Firm*—Eugene S. Indyk

[57] ABSTRACT

An improved optical loop mirror is used in an optical demultiplexer to demultiplex time division multiplexed optical communications channels. High bit-rate optical pulses representing a plurality of time division multiplexed communications channels are input to a 3 dB coupler in an optical loop mirror. The coupler separates the high bit-rate optical pulses into two substantially equal high bit-rate pulse streams propagating in opposite directions around a loop of fiber in the mirror. Lower bit-rate optical switching pulses are injected into the loop so as to substantially coincide with selected pulses in the high bit-rate pulse stream corresponding to a communications channel to be demultiplexed from the plurality of multiplexed communications channels. A gain controlling element, such as an amplifier or a lossy element, in the loop changes the amplitude of one of the two high bit-rate pulse streams flowing in the loop so that the selectivity of the demultiplexer to the desired channel and the rejection of unwanted channels by the demultiplexer is enhanced.

6 Claims, 3 Drawing Sheets

OTHER PUBLICATIONS

T. Morioka and Masatoshi Saruwatari "Ultrafast All–Optical Switching Utilizing the Optical Kerr Effect in Polaization–Maintaining Single–Mode Fibers", IEEE J. on Sel.Areas in Comm., vol. 6, No. 7, Aug. 1988, pp. 1186–1187.

K. J. Blow, et al., "Experimental Demonstration of Optical Soliton Switching in an All–Fiber Nonlinear Sagnac Interferometer," *Optics Letters*, vol. 14, No. 14, Jul. 15, 1989, pp. 754–756.

K. J. Blow, et al., "Two–Wavelength Operation of the Nonlinear Fiber Loop Mirror," *Optics Letters*, vol. 15, No. 4, Feb. 15, 1990, pp. 248–250.

M. E. Fermann, et al., "Nonlinear Amplifying Loop Mirror," *Optics Letters*, vol. 15, No. 13, Jul. 1, 1990, pp. 752–754.

K. J. Blow, et al., "Demonstration of the Nonlinear Fibre Loop Mirror as an Ultrafast All–Optical Demultiplexer," *Electronics Letters*, vol. 26, No. 14, Jul. 5, 1990, pp. 962–964.

K. Smith, et al., "Pulse Shaping, Compression, and Pedestal Suppression Employing a Nonlinear–Optical Loop Mirror," *Optics Letters*, vol. 15, No. 22, Nov. 15, 1990, pp. 1294–1296.

J. D. Moores, et al., "Demonstration of Optical Switching by Means of Solitary Wave Collisions in a Fiber Ring Reflector," *Optics Letters*, vol. 16, No. 3, Feb. 1, 1991, pp. 138–140.

H. Avramopoulos, et al., "Complete Switching in a Three–Terminal Sagnac Switch," *IEEE Photonics Technology Letters*, vol. 3, No. 3, Mar. 1991, pp. 235–237.

B. P. Nelson, et al., "All–Optical Gbit/s Switching Using Nonlinear Optical Loop Mirror," *Electronics Letters*, vol. 27, No. 9, Apr. 25, 1991, pp. 704–705.

N. A. Whitker, Jr., et al., "All–Optical Arbitrary Demultiplexing at 2.5 Gbit/s With Tolerance to Timing Jitter," *Optics Letters*, vol. 16, No. 23, Dec. 1, 1991, pp. 1838–1840.

N. Finalyson, et al., "Switch Inversion and Polarization Sensitivity of the Nonlinear–Optical Loop Mirror," *Optics Letters*, vol. 17, No. 2, Jan. 15, 1992, pp. 112–114.

A. D. Ellis, et al., "Ultrafast All Optical Switching in Two Wavelength Amplifying Nonlinear Optical Loop Mirror," *Electronics Letters*, vol. 28, No. 4, Feb. 13, 1992, pp. 405–406.

K. Smith, et al., "Pulse Amplification and Shaping Using a Nonlinear Loop Mirror That Incorporates a Saturable Gain," *Optics Letters*, vol. 17, No. 6, Mar. 15, 1992, pp. 408–410.

M. Jinno, et al., "All–Optical Regenerator Based on Nonlinear Fibre Sagnac Interferometer," *Electronic Letters*, vol. 28, No. 14, Jul. 2, 1993, pp. 1350–1352.

J. Masahiko, "Effects of Group Velocity Dispersion and Self–Cross Phase Modulation in a Nonlinear Sagnac Interferometer Switch," *Journal of Lightware Technology*, vol. 10, No. 8, Aug. 1992, pp. 1167–1178.

I. Clarke, "Temperature–Stable Spun Elliptical–Core Optical–Fiber Current Transducer," *Optics Letters*, vol. 18, No. 2, Jan. 15, 1993, pp. 158–160.

dance with this invention. It receives a relatively high
FIBER LOOP MIRROR FOR TIME DIVISION DEMULTIPLEXING This application is a continuation of application Ser. No. 08/094,278, filed on Jul. 21, 1993 abandoned.

TECHNICAL FIELD

This invention relates to optical demultiplexing. More particularly, this invention relates to an optical demultiplexer using an improved optical loop mirror.

BACKGROUND

In high capacity optical communications systems, a plurality of channels, each comprising a relatively low bit-rate optical pulse stream, are time division multiplexed into a high bit-rate pulse stream. For example, a plurality of relatively low bit-rate optical soliton pulse streams may be combined into a single high bit-rate optical soliton pulse stream. This multiplexing of data streams, of course, requires that there be a subsequent effective demultiplexing of the high bit-rate data into lower-rate data, for example, demultiplexing 10 to 20 Gbit/sec. data to the well-known 2.5 Gbit/sec. SONET rate.

SUMMARY

Applicants have developed an improved optical demultiplexer which provides a nearly square acceptance window in time, one-bit period wide, for pulses in one of a plurality of time division multiplexed data channels. The acceptance window is centered about the expected arrival times of selected optical pulses in a high bit-rate pulse stream. This demultiplexer provides high switching efficiency for pulses of a desired channel and a nearly complete rejection of the pulses in all other channels. The on/off ratio may be 20 dB or better. The operation of the multiplexer is stable and essentially unaffected by acoustic fields and changes in ambient temperature. It is also compact, inexpensive, and compatible with the usual fiber optic environments.

In a specific example of the invention, an improved loop mirror is used to demultiplex a high bit-rate data channel into a lower bit-rate data channel. The improved loop mirror comprises a loop of fiber for carrying two counterpropagating streams of multiplexed signal pulses. Switching pulses are introduced into the loop to unbalance the loop for selected ones of the pulses in the high bit-rate data, so that those selected pulses are demultiplexed into a lower bit-rate data channel. An unintended phase shift between the counterpropagating streams of signal pulses caused by the switching pulses is counteracted by causing the amplitude of one of the counterpropagating bit streams to be greater than the amplitude of the other of the counterpropagating bit streams.

DETAILED DESCRIPTION

Figure 1:
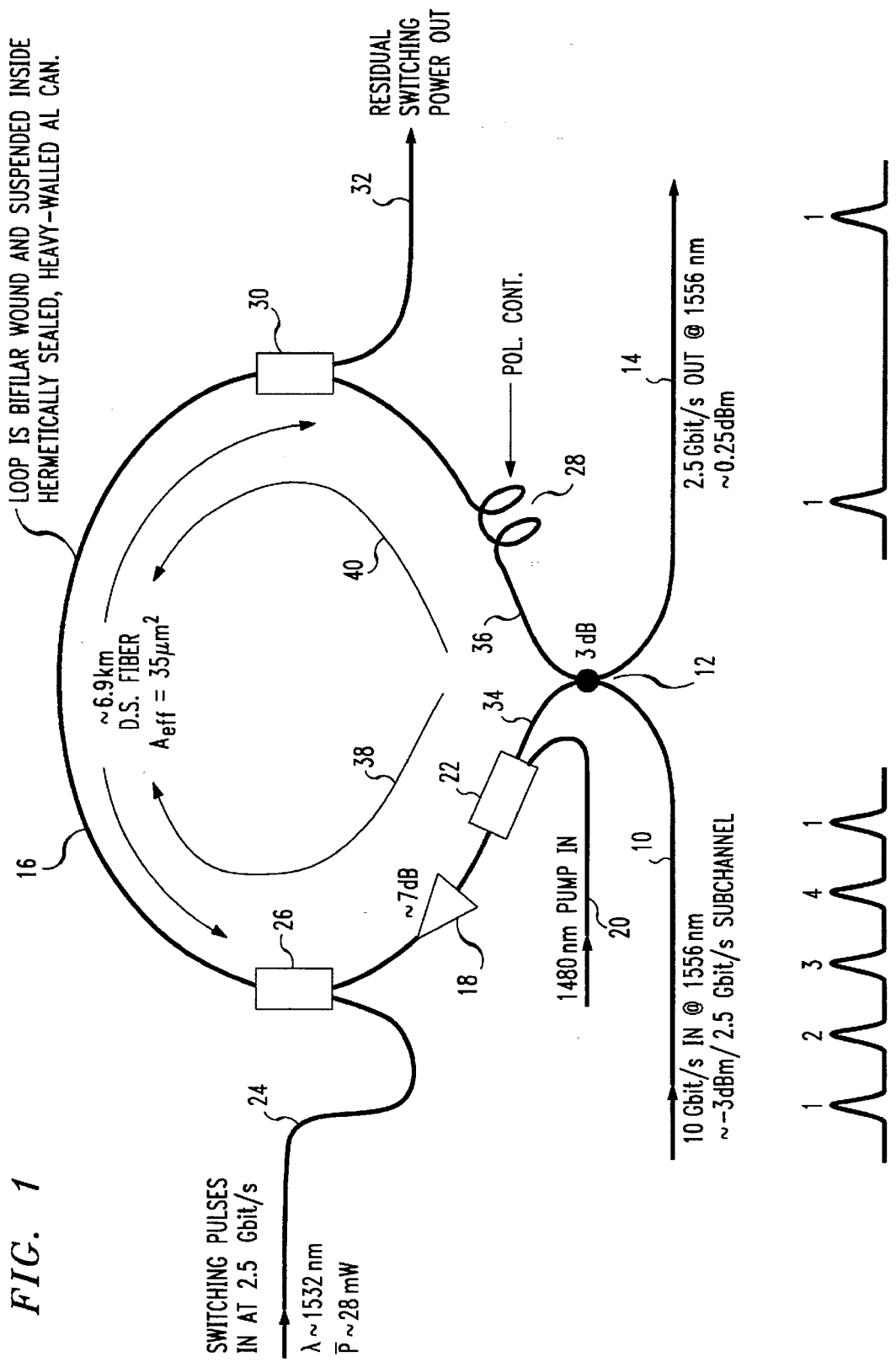
FIG. 1 is a schematic representation of an example of an optical demultiplexer in accordance with this invention.

FIG. 1 shows an example of a demultiplexer in accordance with this invention. It receives a relatively high bit-rate stream of optical signal pulses. The high bit-rate stream of pulses represents a time division multiplexed plurality of signal channels. The multiplexer outputs only one of the plurality of signal channels in the form of a lower bit rate demultiplexed stream of optical signal pulses. For example, in FIG. 1, the demultiplexer receives a high bit-rate stream of time division multiplexed soliton pulses having a 1556 nm wavelength at a rate of 10 Gbit/sec. In the example of FIG. 1, the input bit stream represents four time division multiplexed communications channels numbered 1 to 4. The input bit stream flows into the multiplexer of FIG. 1 on an input fiber 10 which is connected to a 3 Db coupler 12. The pulses from only one of the communications channels, for example, channel 1, are output by the demultiplexer of FIG. 1 on an output fiber 14 connected to the coupler 12. The demultiplexed stream of pulses are, for example, 1556 nm pulses at a rate of 2.5 Gbit/sec. The pulses of the other multiplexed channels input to the device of FIG. 1 are effectively suppressed from the output bit stream and only the pulses of the desired channel are present on output fiber 14.

A loop of optical fiber 16, which in this example may be dispersion shifted fiber about 6.9 km long with an A(eff) of about 35 square microns, is also connected to the coupler 12. An erbium doped fiber amplifier 18 is in series with the fiber loop 16. Pump power for the amplifier 18 is provided by means of a fiber 20 which is connected to a coupler 22 in the loop 16. The amplifier 18 may provide about 7 Db of gain in the fiber loop 16 in this example of the invention. In other examples of the invention, a gain of up to 28 Db or more may be provided.

Switching pulses of optical energy are provided to the fiber loop 16 by means of a fiber 24 connected to a wavelength selective coupler 26 situated in the fiber loop 16. The switching pulses in this example of the invention may have a wavelength of 1532 nm and may be injected into the loop 16 at a rate of 2.5 Gbit/sec. The time average power of these switching pulses is about 28 mw; and their peak power is on the order of 1 watt. These switching pulses in this example of the invention are timed to substantially coincide with the arrival of a pulse associated with a channel which is desired to be demultiplexed from the multiplexed stream of input optical pulses on fiber 10.

A polarization controller 28 may be located in the loop 16 to compensate for differing effects produced by the fiber on polarization of optical energy flowing clockwise and counterclockwise through the fiber loop 16. In an actual system, the birefringence of the fiber in the loop 16 may drift due to temperature changes and mechanical creep and therefore, it may be desirable to automatically control the setting of the polarization controller 28 to account for this drift. Alternatively, this polarization controller may be unnecessary where a kind of fiber is used which does not produce differing effects on the polarization of optical energy flowing clockwise and counterclockwise in the loop 16. The fiber loop 16 in FIG. 1 may also have a wavelength-dependent directional coupler 30 for directing the residual switching power out of the fiber loop onto an output fiber 32.

Optical power input to the device of FIG. 1 on fiber 10 will enter the coupler 12 and be equally split between fibers 34 and 36. Thus, two counterpropagating optical pulse streams will be injected into the loop 16. One such pulse stream will travel around the loop 16 in a clockwise direction beginning at fiber 34 and progressing around the loop 16 to re-enter the coupler 12 at fiber 36. This is schematically represented in FIG. 1 by an arrow 38. The other pulse stream will travel around the loop 16 in a counterclockwise direction beginning at fiber 36 and progressing around the loop 16 to re-enter the coupler 12 at fiber 34. This is schematically represented in FIG. 1 by an arrow 40. With no switching pulses applied to the loop 16, the device of FIG. 1 will act as a perfect mirror for the pulses on fiber 10 and no output pulses will be evident on fiber 14 because of perfect cancellation (distruction interference) at the output port 14 of the two pulse streams flowing around the loop 16 and into the coupler 12.

If appropriate switching pulses are injected into the loop 16 at the coupler 26, the loop 16 may become unbalanced and selected channels may be retrieved on fiber 14 from the multiplexed plurality of channels input on fiber 10. For example, if the switching pulses are substantially less than one bit period wide and are timed to substantially coincide with the appearance of pulses associated with the desired channel to be demultiplexed at the coupler 26, each such pulse will be walked around the loop 16 by a switching pulse and because of cross phase modulation of the clockwise propagating pulses of the desired channel by the switching pulses, the clockwise propagation pulses of the desired channel will be phase shifted with respect to the corresponding counterclockwise propagating pulses of the desired channel. The device of FIG. 1 thus will be unbalanced with respect to pulses in the desired channel, the clockwise and counterclockwise pulses for that channel will no longer perfectly cancel when they return to the coupler 12, and those pulses will then appear on the output fiber 14. Ideally, the pulses in the other channels will still undergo perfect cancellation in the coupler 12 and will not be evident on the output fiber 14.

The clockwise propagating switching pulses in the loop 16, however, do induce a smaller but significant phase shift in the pulses associated with the unwanted channels propagating in a counterclockwise direction through the loop 16 because those counterclockwise traveling pulses pass through each clockwise travelling switching pulse. Since the clockwise travelling pulses in the unwanted channels do not cross the switching pulses or overlap any of those switching pulses, the device of FIG. 1 will be somewhat unbalanced with respect to the unwanted channels as well as the channel desired on output fiber 14. The selectivity of the device of FIG. 1 thus is impaired because some of the energy associated with the pulses in the unwanted channels also appears on the output fiber 14 with the pulses from the desired channel. Accordingly, an amplifier 18 provides gain to the fiber loop 16 to compensate for the effect of the switching pulses on the counterclockwise propagating pulses in the unwanted channels. An amplifier 18 near the coupler 12 between the fiber 34 and the coupler 26, when it is supplied with appropriate pump power via fiber 20 and coupler 22, increases the intensity of clockwise propagating pulses to a level which is greater than the intensity of the counterclockwise propagating pulses. Because the amplifier 18 is close to the coupler 12 as shown in FIG. 1, a differential in the self-phase modulation experienced by the clockwise and counterclockwise propagating pulses may be created. This differential creates a phase shift between the clockwise and counterclockwise propagating pulses which exactly counteracts the phase shift caused by the counterclockwise propagating pulses passing through clockwise propagating switching pulses.

Figure 3:
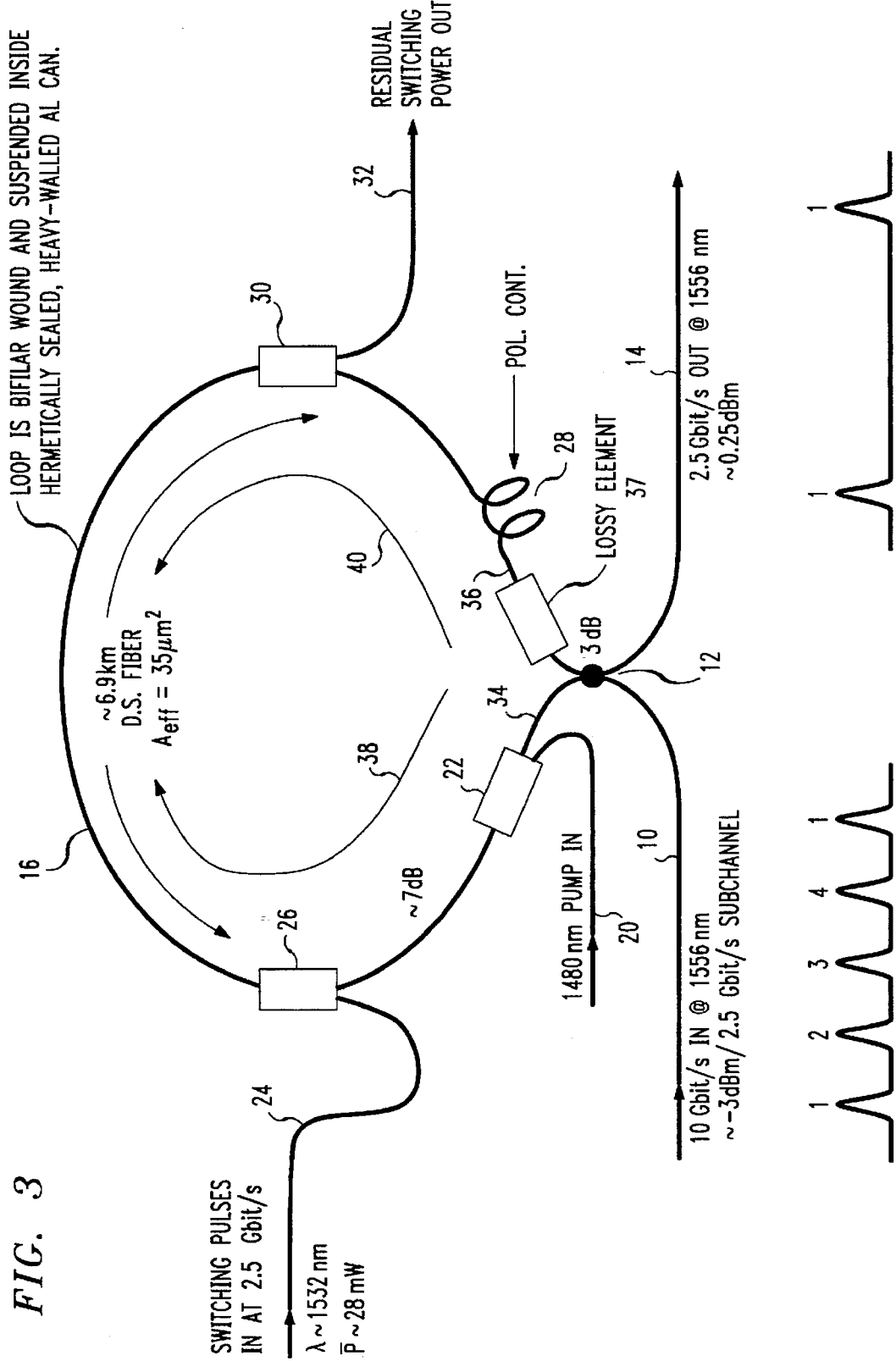
FIG. 3 is another example of an optical demultiplexer in accordance with this invention.

It is preferred that the difference in the intensities of the clockwise propagating pulses and the counterclockwise propagating pulses in the loop 16 be produced by an erbium doped fiber amplifier 18 as in FIG. 1. However, it is possible to produce this intensity difference by means of another kind of amplifier such as a semiconductor diode amplifier. This intensity difference may also be created by placing a lossy element 37 in the loop 16 near the coupler 12, for example, near the fiber 36 between the coupler 12 and polarization controller 28. See FIG. 3. Erbium doped fiber amplifiers, such as amplifier 18 in FIG. 1, are preferred, however, because their gain and saturation characteristics confer some additional benefits to an apparatus like the one shown in FIG. 1. For example, those benefits include the fact that this device may exhibit a signal gain essentially equal to the gain of the amplifier 18 save for some modest internal losses. Also, the long-term saturation characteristics enable an erbium fiber amplifier to yield a desired signal power inside the loop for a range of input signal power levels. Since that range expands with increasing amplifier gain, it may be desirable to use gains considerably beyond the illustrative 7 dB saturated gain of the amplifier 18 in FIG. 1. For example, it may be possible to use amplifier gains up to 28 dB or higher without problems of instability from stray feedback.

A more or less square acceptance window in time is provided by making the difference in transit times through the loop, for switched and switching pulses, equal to the desired window width. (The desired width is usually one bit period of the incoming bit stream—for example, 100 ps for the 10 Gbit/s data stream of FIG. 1.)

In order to achieve thermal and acoustic insensitivity for a device such as the one shown in FIG. 1, the loop 16 is wound in a bifilar manner inside a hermetically sealed heavy walled aluminum can. For example, the walls of this aluminum can may be about 12.7 mm thick. The fiber of loop 16 is divided into two equal parts and wound side by side on a common bobbin. The innermost ends of the fiber are then spliced together and the outermost free ends of the fibers then become the extreme two ends of the loop, respectively. With this configuration, each half of a particular pulse, traversing the loop in one or the other direction, always has its partner very close by in the other half of the loop. Thus, the partners are always subject to the same, or very nearly the same, sound field, so that phase shifts and other effects induced by those fields will be the same, and hence will always cancel each other, for the two pulse halves. The loop 16 is suspended in the previously mentioned aluminum can to afford acoustic isolation from the environment in which the device of FIG. 1 is used.

Figure 2:
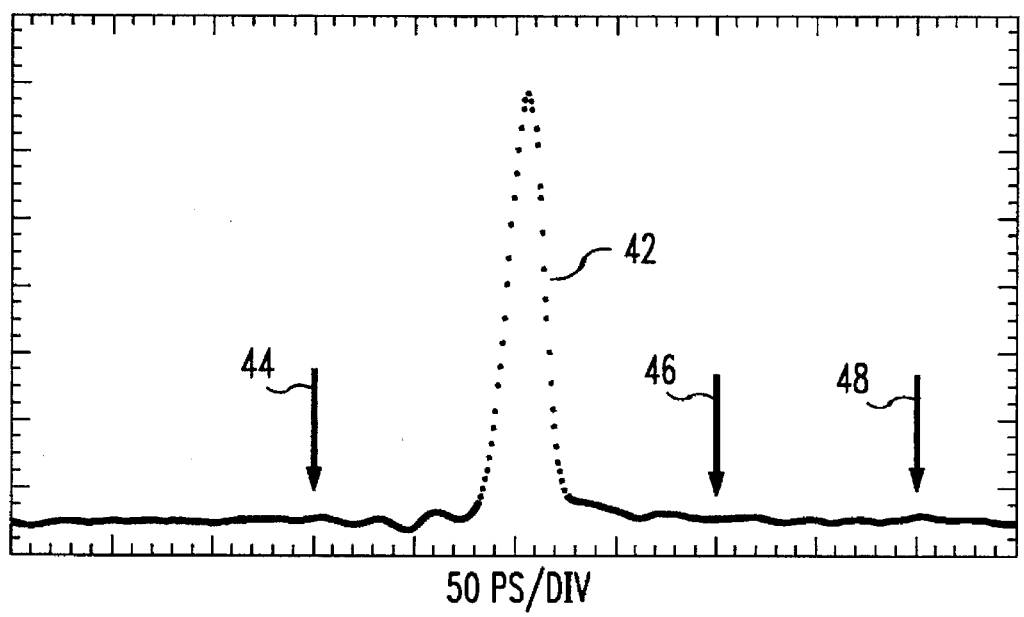
FIG. 2 is a graphical representation of experimental results obtained for the demultiplexer of FIG. 1 showing that the demultiplexer has a high degree of selectivity for desired signal pulses from one channel of a time division multiplexed plurality of communication channels and a high degree of rejection of unwanted signal pulses from all others of the plurality of multiplexed communication channels.

A demultiplexer in accordance with this invention provides a deep and polarization independent null with respect to unwanted communications channels. Experimentally, the observed nulls are considerably more than 20 dB below the level of the pulses switched out of the demultiplexer of FIG. 1 on fiber 14, independent of signal polarization. See FIG. 2 which shows an example of what has been obtained with the device of FIG. 1. FIG. 2 shows the amplitude of a switched out pulse from a desired channel represented by the spike 42 and the amplitudes of adjacent pulses from unwanted channels which are rejected by the demultiplexer as indicated by arrows 44, 46, and 48. It is clear that the demultiplexer of FIG. 1 switches out desired pulses with great efficiency and undesired pulses are essentially absent from the output of the demultiplexer of FIG. 1.

We claim:

1. A demultiplexing apparatus, comprising:
    an input for receiving a plurality of multiplexed communications channels comprising a stream of electromagnetic energy pulses of arbitrary polarization;

an output for transmitting selected ones of the electromagnetic energy pulses; and a fiber loop mirror between the input and the output for carrying first and second streams of electromagnetic energy pulses, wherein said first streams travel clockwise and said second streams travel counterclockwise between the input and the output;

means for coupling switching pulses of electromagnetic energy that travel clockwise to the loop mirror; and means for providing differential intensity for the first and second streams of pulses carried around the fiber loop mirror to cancel a phase shift induced by said switching pulses in said second streams to achieve a polarization independent null at the output for non-selected ones of the electromagnetic energy pulses.

2. The demultiplexing apparatus of claim 1, in which the means for providing differential intensity comprises an amplifier in the fiber loop mirror.

3. The demultiplexing apparatus of claim 1, in which the means for providing differential intensity comprises a lossy element in the fiber loop mirror.

4. A demultiplexing apparatus, comprising:

an input for receiving a plurality of multiplexed communications channels comprising a stream of electromagnetic energy pulses of arbitrary polarization;

an output for transmitting selected ones of the electromagnetic energy pulses;

a fiber loop mirror between the input and the output for carrying first and second streams of electromagnetic energy pulses, wherein said first streams travel clockwise and said second streams travel counterclockwise between the input and the output;

means for coupling switching pulses of electromagnetic energy that travel clockwise to the loop mirror; and means for changing the gain in the loop mirror to cancel a phase shift induced by said switching pulses in said second streams to achieve a polarization independent null at the output for non-selected ones of the electromagnetic energy pulses.

5. A fiber loop mirror, comprising:

a optical coupler for receiving a stream of multiplexed data channels of arbitrary polarization, a loop of fiber connected to the coupler for carrying counterpropagating first and second multiplexed channels;

a switching pulse coupler in the loop of fiber that couples switching pulses of electromagnetic energy that counterpropogate relative to said second multiplexed channels; and an amplifier in the loop of fiber to cancel a phase shift induced by said switching pulses in said second multiplexed channels to achieve a polarization independent null at an output for non-selected ones of the multiplexed data channels.

6. An optical loop mirror, comprising:

means for receiving multiplexed optical input pulses of arbitrary polarization;

a loop of fiber connected to the receiving means for carrying first signal pulses having a first intensity related to the multiplexed input pulses in a first direction around the loop and second signal pulses having a second intensity related to the multiplexed input pulses in a second direction opposite said first direction around the loop, the first intensity being greater than the second intensity;

means for coupling switching pulses into the loop that travel in said first direction for demultiplexing selected ones of the multiplexed optical input pulses;

means for outputting demultiplexed optical input pulses from the loop of fiber; and an amplifier in the loop of fiber to cancel a phase shift induced by said switching pulses in said second signal pulses to achieve a polarization independent null at the output for non-selected ones of the multiplexed optical input pulses.

\* \* \* \* \*